United States Patent [19]
Ohguri

[11] Patent Number: 5,225,039
[45] Date of Patent: Jul. 6, 1993

[54] METHOD FOR PRODUCING A DIFFRACTION GRATING

[75] Inventor: Noriaki Ohguri, Zama, Japan

[73] Assignee: Canon Kabushiki Kaisha, Tokyo, Japan

[21] Appl. No.: 882,614

[22] Filed: May 13, 1992

[30] Foreign Application Priority Data

May 14, 1991 [JP] Japan .................................. 3-138228
May 14, 1991 [JP] Japan .................................. 3-138229

[51] Int. Cl.$^5$ ...................... H01L 21/306; B44C 1/22; C23F 1/00
[52] U.S. Cl. .................................. 156/651; 156/654; 156/656; 156/661.1; 156/662; 156/663; 430/321; 430/323
[58] Field of Search ............... 156/651, 654, 656, 657, 156/659.1, 661.1, 662, 663, 904; 430/323, 321, 329; 359/566

[56] References Cited

U.S. PATENT DOCUMENTS 4,988,404 1/1991 Aoyagi ................................. 156/651

FOREIGN PATENT DOCUMENTS 62-262004 11/1987 Japan .

OTHER PUBLICATIONS

"λ4/ shifted DFB-LD corrugation formed by a novel spatial phase modulating mask", Shirasaki et al., OQE 85-60, Fujitsu Laboratories Ltd., pp. 57-64.

"Phase-shift grating for single mode DFB lasers fabricated by phase projection type holography", Informal Papers of Electronics Communication Academy Semiconductor-Material Division Grand Meeting, 1985, p. 127.

"Novel Fabrication Method of Quarter-Wave-Shifted Gratings Using ECR-CVD SiN x films" by H. Sugimoto et al., Electronics Letters Nov. 19, 1987 vol. 23 No. 24; pp. 1260-1261.

"New High-Resolution Positive and Negative Photoresist Method for λ/4 Shifted DFB Lasers" by M. Okai et al., Electronics Letters Apr. 9, 1987 vol. 23 No. 8; pp. 370-371.

*Primary Examiner*—William M. Powell
*Attorney, Agent, or Firm*—Fitzpatrick, Cella, Harper & Scinto

[57] ABSTRACT

A phase-shifted diffraction grating for devices such as semiconductor lasers is produced by forming a first diffraction grating pattern of a first material having a reference pitch on a substrate. The substrate is then coated with a second material on both the first material and an exposed portion of the substrate in a region where a second diffraction grating having a pitch which is the reverse of the reference pitch of the first diffraction grating pattern is to be formed. The first material is removed by lift off to obtain the second diffraction grating pattern on the second diffraction grating region. The substrate is etched using the first diffraction grating as an etching mask to form the first diffraction grating and then the substrate is etched with the second diffraction grating pattern as an etching mask to obtain a second diffraction grating continuous with the first diffraction grating. The first diffraction grating pattern may have a rectangular or square shape to stably and accurately remove the first material by lift-off and the boundary between the first and second diffraction gratings can be stably and accurately defined by self-alignment.

24 Claims, 6 Drawing Sheets

He-Cd LASER LIGHT
($\lambda = 325$ nm)

FIG.5
(PRIOR ART)

(ECR SiNx FILM DEPOSITION)

(LIFT-SIDE SUBSTRATE ETCHING)

(SiNx DIFFRACTION GRATING FORMING)

(RIGHT-SIDE SUBSTRATE ETCHING)

METHOD FOR PRODUCING A DIFFRACTION GRATING

BACKGROUND OF THE INVENTION

1. Field of the Invention

This invention relates to a method for producing a diffraction grating, and more particularly, to a method for producing a phase-shifted diffraction grating such as λ/4-shifted diffraction grating for use in various devices such as filters and semiconductor lasers, typically distributed feedback (DFB) type lasers.

2. Related Background Art

Diffraction gratings have been used in opto-electronic fields as various optical circuit devices such as filters, optical couplers, distributed feedback (DFB) type lasers, distributed Bragg reflection (DBR) type lasers and the like. In particular, DFB and DBR lasers using diffraction gratings as resonators for lasers have been studied and developed for their stable dynamic single mode characteristics that make oscillation wavelengths stable even if the lasere are directly modulated.

On the other hand, λ/4-shifted DFB lasers with phase-shifted diffraction gratings have been developed several years ago to improve the oscillation singularity of these lasers (see Japanese Patent Laid-open No. 62-262004). The λ/4-shifted DFB laser oscillates in a single longitudinal mode which is equal to a Bragg wavelength thereof, so that a previous problem of oscillation occurring in two longitudinal modes in conventional lasers has almost been solved.

The following methods have been used in fabricating structures that achieve the λ/4-shift effect, when classified roughly.

(1) The period or phase of a diffraction grating is reversed halfway thereof, and its phase is shifted by λ/4 or quarter wave.

(2) The phase of light is equivalently shifted by partially adjusting its propagation constant by means of a change in the width of a diffraction grating and the like.

Method (1) can be realized comparatively readily. In the method (1), ordinary diffraction grating producing techniques can be adopted.

Further, the following methods are known to produce a phase-shifted type diffraction grating, roughly classified.

Figure 1:
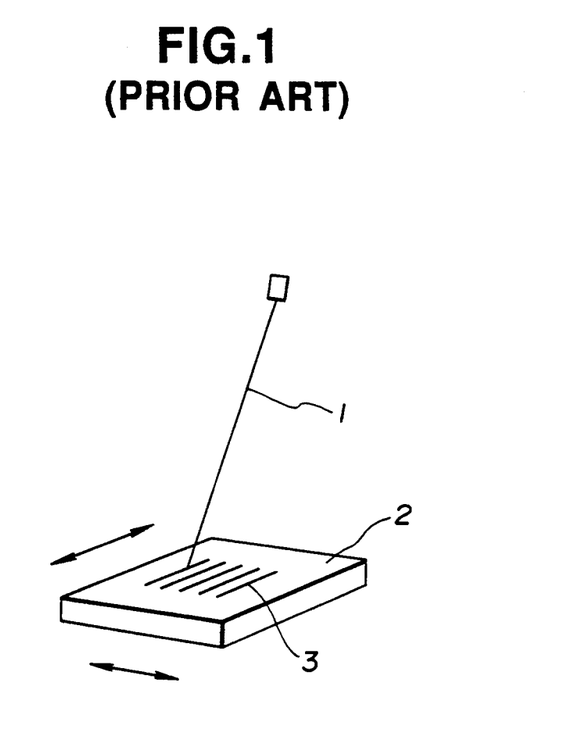
FIG. 1 is a view illustrating steps of a first prior art diffraction grating fabricating method.

(1) An electron beam direct depicting method is shown in FIG. 1. An electron beam 1 is scanned in directions of arrows on a substrate 2 to form a diffraction grating 3.

Figure 2:
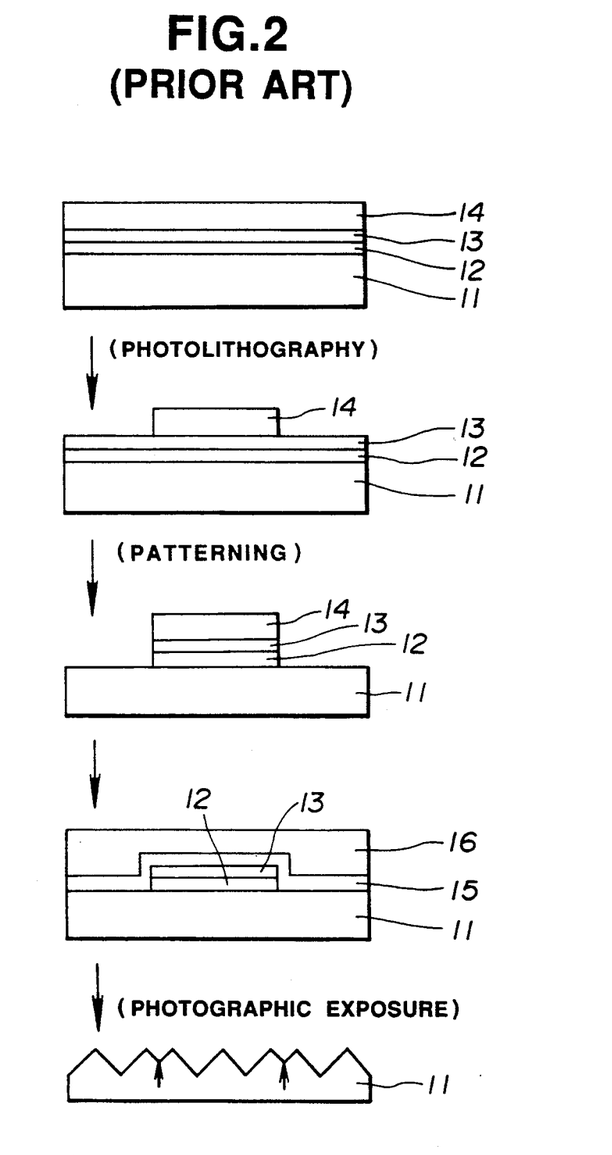
FIG. 2 is a view illustrating steps of a second prior art diffraction grating fabricating method.

(2) An interference exposure method in which both of high-resolution positive and negative photoresists of novolac series are used and an intermediate layer is provided to prevent mixing between these photoresists as shown in FIG. 2.

Initially, a 70 nm-thick negative photoresist (ONNR-20) 12, a 60 nm-thick cyclised polyisoprene (OBC) 13 and a 0.5 μm-thick positive photoresist (MP-1400) of AZ layer 14 are spin-coated successively onto an InP substrate 11. Next, striped patterns of positive photoresist are generated by photolithography. Using these patterns as a mask, the cyclised polyisoprene 13 and the negative photoresist 12 are etched off by an $H_2SO_4 + H_2O_2$ solution. Then, negative photoresist line patterns covered with the cyclised polyisoprene 13 are obtained by removing the positive photoresist 14 by means of its developer. After this, a positive AZ photoresist layer 15 for interference exposure and a 70 nm-thick polyvinyl alcohol (PVA) 16 are spin-coated. The PVA 16 enhances the photosensitivity of the negative photoresist 12 because oxygen in air does not penetrate this thin film. Using this technique, almost the same photosensitivity is obtained for the positive and negative photoresists 15 and 12. After holographic exposure on the photoresist patterns using an He-Cd laser beam (λ=325 nm), the photoresists 12 and 15 are developed and the photoresist pattern is transcribed to the substrate 11 by wet etching, separately for each photoresist region. Thus, the phase-shifted diffraction grating is fabricated. In this connection, see M. OKAI et al, "NEW HIGH-RESOLUTION POSITIVE AND NEGATIVE PHOTORESIST METHOD FOR λ/4-SHIFTED DFB LASERS", Electron. Lett., Apr. 9, 1987, Vol. 23, No. 8, pp. 370-371.

Figure 3:
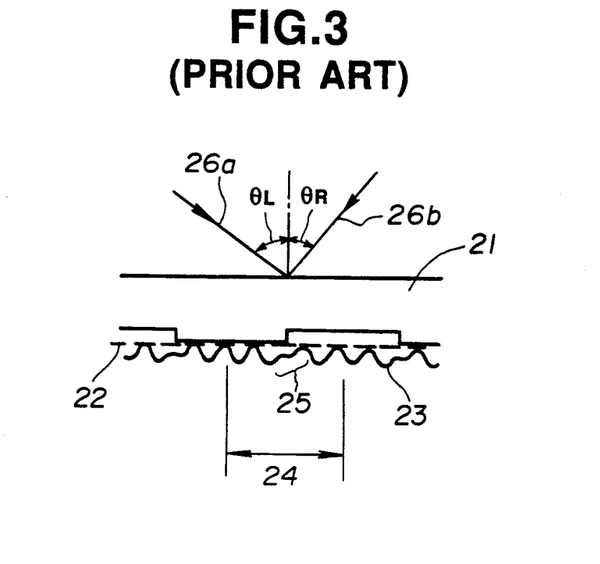
FIG. 3 is a view illustrating steps of a third prior art diffraction grating fabricating method.

(3) An interference exposure method using a contact mask 21 of quartz as a phase mask is shown in FIG. 3. The contact mask 21 is made of a transparent material whose thickness is varied according to its region. In FIG. 3, reference numeral 22 designates a substrate surface, reference numeral 23 designates interference fringes, reference numeral 24 designates a laser resonator, reference numeral 25 designates a transient area and reference numerals 26a and 26b designate laser light beams entering the contact mask 21 at incident angles $\theta_L$ and $\theta_R$, respectively. In this connection, see M. SHIRASAKI et al, "λ/4 shifted DFB-LD corrugation formed by a novel spatial phase modulating mask", OQE 85-60, FUJITSU LABORATORIES LTD., pp. 57-64.

Figure 4:
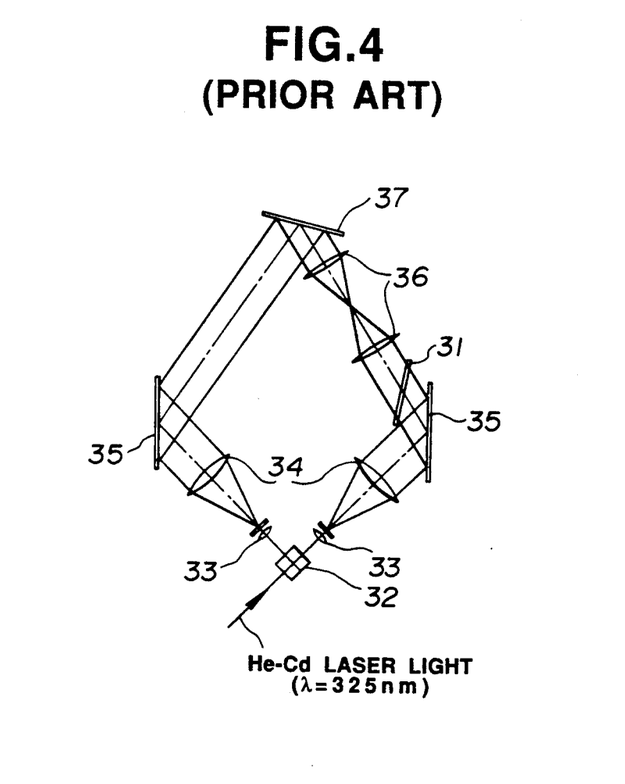
FIG. 4 is a view illustrating steps of a fourth prior art diffraction grating fabricating method.

(4) An interference exposure method using a projected image of a phase mask or a phase plate 31 is shown in FIG. 4. In FIG. 4, reference numeral 32 designates a beam splitter, reference numeral 33 designates a spatial filter, reference numeral 34 designates a collimating lens, reference numeral 35 designates a plane mirror, reference numeral 36 designates a lens system having a common focal point and reference numeral 37 designates a sample surface. In this connection, see S. TSUJI et al, "phase-shift grating for single mode DFB lasers fabricated by phase projection type holography", Informal Papers of Electronics Communication Academy Semiconductor-Material Division Grand Meeting, 1985, p. 127.

Figure 5:
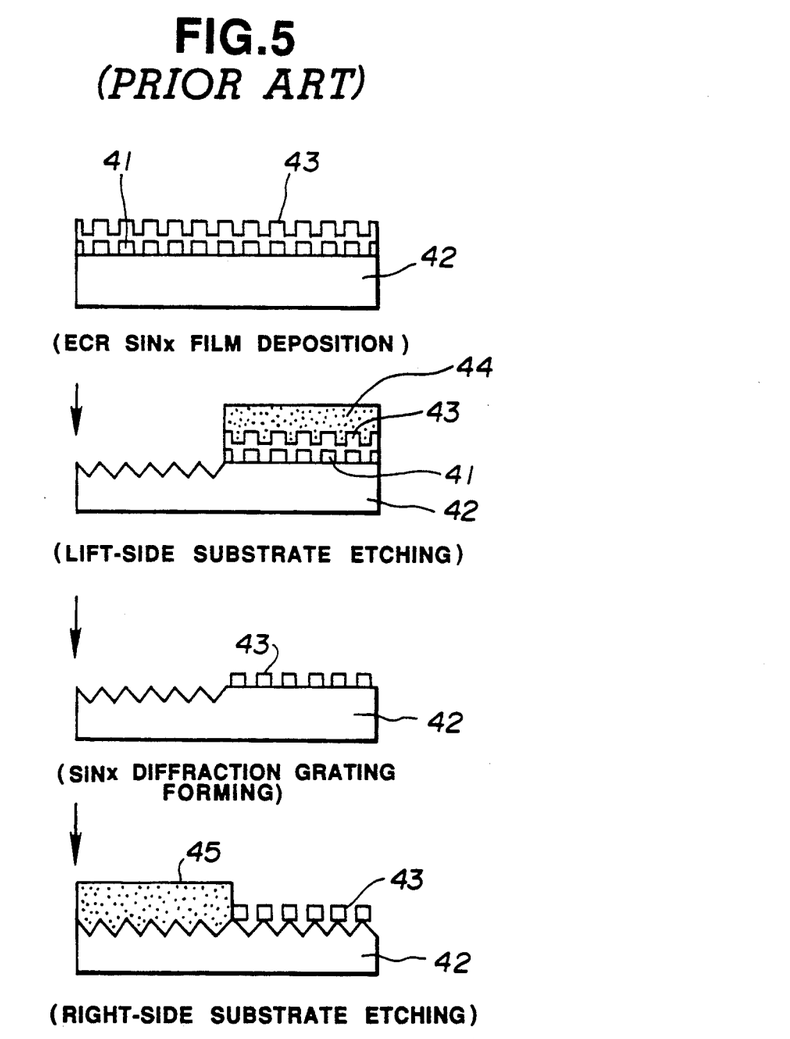
FIG. 5 is a view illustrating steps of a fifth prior art diffraction grating fabricating method.

(5) A method in which a conventional interference exposure method is used and a part is reversely transferred onto a substrate using $SiN_x$ layer formed by an electron cyclotron resonance-chemical vapor deposition (ECR-CVD) method is shown in FIG. 5. In FIG. 5, initially, a diluted positive photoresist (MP-1400) 41 is spin-coated onto an InP substrate 42. Then an ordinary holographic exposure with an He-Cd laser beam (325 nm) and development are performed to make a photoresist corrugation 41 with a period of 240 nm. The $SiN_x$ film 43 is deposited onto it by ECR-CVD at room temperature. After spin-coating a photoresist 44 again, striped patterns parallel to the corrugation 41 are formed by conventional photolithography. In this procedure the $SiN_x$ film 43 prevents the photoresist corrugation 41 from being dissolved into the developer. Using these striped patterns as a mask, etching of the $SiN_x$ film 43 is performed. In the region where the $SiN_x$ film is taken off, the InP substrate 42 is etched using the photoresist corrugation 41 as a mask to fabricate a diffraction grating on the InP substrate 42. Then the photoresist 44 covering the $SiN_x$ film 43 is removed. In the next step, an SiN$_x$ film corrugation 43, whose phase is reverse to the photoresist corrugation, is produced in the region where the SiN$_x$ film have been covered and not etched. In this process a unique characteristic of the ECR-CVD SiN$_x$ film 43 is utilised. The SiN$_x$ film 43 deposited on the photoresist 41 is etched by a buffered HF solution (BHF) at a higher rate than on the flat substrate. By optimising the etching condition, this difference in etching rates makes it possible to not etch only the parts of the SiN$_x$ film 43 on the flat substrates. After removing the photoresist and covering the previously formed grating on the substrate 42 with photoresist 45, the InP substrate 42 is etched using the SiN$_x$ film corrugation 43 as a mask. With this process, a quarter-wave-shifted diffraction grating is fabricated on the InP substrate 42. In this connection, see H. SUGIMOTO et al, "NOVEL FABRICATION METHOD OF QUARTER-WAVE-SHIFTED GRATINGS USING ECR-CVD SiN$_x$ FILMS", Electron. Lett., Nov. 19, 1987, Vol. 23, No. 24, pp. 1260-1261.

However, the above-discussed methods for fabricating a phase-shifted type diffraction grating have the following disadvantages:

In the first method (FIG. 1), while a fine pattern can be directly depicted on the substrate 2 with high accuracy, a proximity effect appears between adjacent gratings depending on the relationship between the grating interval (e.g., 0.25 μm) and the electron beam diameter (e.g., 0.1 μm) and a backscattering due to the electron beam scattering on a substrate surface having a photoresist coated thereon. As a result, it is difficult to form the diffraction grating 3 having a pitch of less than 0.3 μm on a thick resist or a thick substrate. Further, its throughput and yield are inevitably reduced.

In the second method (FIG. 2), a complicated fabrication process is needed. That is, differences in appropriate exposure and development conditions for positive and negative photoresists 15 and 12 having different photosensitivities render the control of these conditions difficult. As a result, its reproducibility is poor and its yield is reduced.

In the third method (FIG. 3), the phase transient area 25 of the laser resonator 24 is widened due to a Fresnel diffraction of light beams 26a and 26b applied to cause the interference exposure unless the contact between the contact mask 21 and the photoresist layer coated on the substrate's surface 22 is sufficient.

In the fourth method (FIG. 4), the phase shifter 31 of a quartz plate having a step corresponding to a phase shift is disposed in the optical system, and this phase shifter 31 is irradiated with a slant projected light beam. The slant projection is required since the image must be formed on the sample surface 37 to which two beams are slantedly applied. As a result, aberrations occur on the sample surface 37, and hence an area on which the diffraction grating can be formed is limited.

In the fifth method (FIG. 5), it is difficult to control the etching conditions of the SiN$_x$ film 43 on the resist 41 and the substrate 42. Moreover, two etchings are performed for the substrate 42, and the control of the conditions is difficult. Thus, the shape of the diffraction grating is likely to be irregular, and the accuracies of depth and size thereof are lowered.

SUMMARY OF THE INVENTION

It is an object of the present invention to provide a method of fabricating a diffraction grating having a shifted phase on a common substrate with good accuracy and stability.

According to one aspect of the present invention, there are the steps of: forming a first diffraction grating pattern of a first material having a reference pitch on a substrate, coating a second material different from the first material on both of the first material and an exposed portion of the substrate in a region where a second diffraction grating pattern having a pitch reverse to the reference pitch of the first diffraction grating pattern of the first material is to be formed, removing the first material by a lift-off method to obtain the second diffraction grating pattern of the second material having the reverse pitch in the region on the substrate, etching the substrate with the first diffraction grating pattern of the first material having the reference pitch used as an etching mask to form a first diffraction grating and etching the substrate with the second diffraction grating pattern of the second material having the reverse pitch used as an etching mask to obtain a second diffraction grating continuous to the first diffraction grating and hence a phase-shifted diffraction grating.

According to another aspect of the present invention, there are the steps of: forming a first diffraction grating pattern of a first material having a reference pitch on a substrate, coating a second material different from the first material on both of the first material and an exposed portion of the substrate in a region where a second diffraction grating pattern having a pitch reverse to the reference pitch of the first diffraction grating pattern of the first material is to be formed, forming a first etching protection layer on the region where the second diffraction grating pattern is to be formed, etching the substrate with the first diffraction grating pattern of the first material having the reference pitch used as an etching mask to form a first diffraction grating, forming a second etching protection layer on a region where the first diffraction grating is formed, removing the first material by a lift-off method to obtain the second diffraction grating pattern of the second material having the reverse pitch, and etching the substrate with the second diffraction grating pattern of the second material having the reverse pitch used as an etching mask to form a second diffraction grating continuous to the first diffraction grating and hence a phase-shifted diffraction grating.

In the method of fabricating a phase-shifted diffraction grating of the present invention, the first diffraction grating pattern is preferably shaped into a rectangular or square shape in order to stably and accurately perform the first material removing step by the lift-off method. Further, a boundary between the first and second diffraction gratings can be stably and accurately defined in a self-alignment manner, i.e., automatically without using mask alignment.

These advantages and others will be more readily understood in connection with the following detailed description, claims and drawings.

DESCRIPTION OF THE PREFERRED EMBODIMENT

FIGS. 6A–6M respectively show steps of an embodiment of a diffraction grating producing method according to the present invention.

Figure 6A:
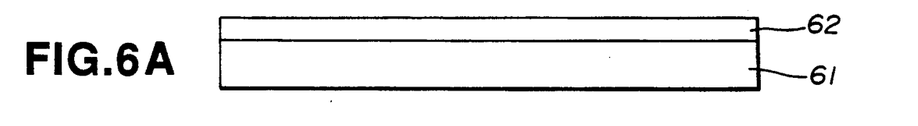
FIGS. 6A–6M are views illustrating steps of an embodiment according to the present invention.

Initially, a semiconductor substrate 61 is cleaned by a surface active agent, and then is cleaned by ultrasonic means two or three times using an organic solvent. Thereafter, the substrate 61 is heat-treated at a temperature of 200° C. for thirty (30) minutes by drying it with an $N_2$ blow. Then, a photoresist layer 62 for a two-beam interference exposure is formed on the substrate 61 by coating a photoresist made by diluting to a desired concentration over the substrate 62. This substrate 61 with the photoresist 62 is soft-baked at a temperature of 115° C. for forty five (45) seconds. Before forming the photoresist layer 62, hexamethyldisilazane (trade name HMDS: produced by Tisso Inc.) that is a contact-enhancing agent may be spin-coated on the substrate 61 and the heat-treatment at a temperature of 150° C. may be performed for ten (10) minutes.

In this embodiment, a composition of the photoresist for interference exposure is as follows: Polyvinylphenol (its average molecular weight is 15,000 in terms of a polystyrene reduction) and a mixture of naphtoquinonediazide-5-sulfonylchrolide and ester compound of 2,3,4 trihydroxybenzophenon (photosensitive agent) (weight ratio 3:1) are dissolved into ethylcellosolveaceto, and this is filtered by a membrane filter of 0.2 μm made of Teflon (trade name).

The thickness of the photoresist 62 is properly set to 800 Å–1000 Å or less than 3000 Å (see FIG. 6A).

The photoresist layer 62 is then exposed to two light beams respectively entering at incident angles corresponding to a desired period or pitch, according to the two-beam interference exposure method using an He-Cd laser (wavelength: $\lambda = 325$ nm). The photoresist layer 62 is then developed with a developer of alkali group. As a result, a resist pattern (diffraction grating) 63 is formed corresponding to a photosensitivity degree resulting from the intensity distribution of interference fringes caused by the interference exposure (see FIG. 6B). The diffraction grating 63 has a rectangular or square shape.

Figure 6B:
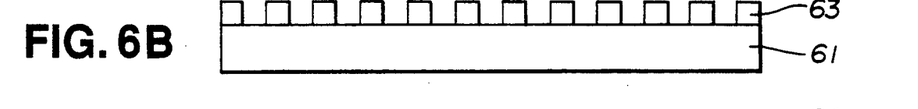
Figure 6C:
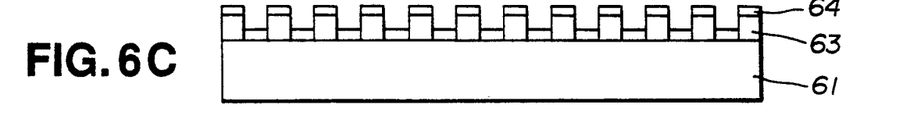
Figure 6D:
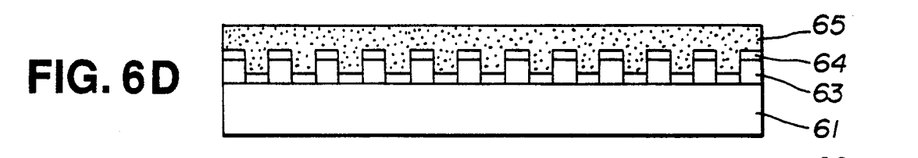

In the process of fabricating the diffraction grating 63 of a rectangular or square shape, a specific photoresist is used, and after the two-wave interference exposure is performed using the He-Cd laser or the like, the development is conducted using a specific developer. For the photoresist, it is desirable to use a base resin that is as transparent as possible to the wavelength of the exposure light (i.e., its absorption factor thereto is as small as possible). Polyvinylphenol or its copolymer with an appropriate different monomer or monomers is desirably used. For example, styrene, paramethylstyrene, α-methylstyrene, derivatives of styrene can be enumerated.

For a photosensitive agent of the photoresist, quinonediazide group such as a mixture of 1,2 naphtoquinonediazide-5-sulfonylchrolide, 1,2 naphtoquinonediazide-4-sulfonylchrolide or the like mixed with compound having no carbonyl group such as bisphenol A exhibiting no absorption to the wavelength of the exposure light is desirably used.

For a principal solvent, ethyllactate, ethyl acetate cellosolve, propylene glycol monomethyl ether acetate, lactic acid ethyl, diacetone alcohol, cyclohexanone or the like can be enumerated. For the developer, an alkaline solution such as trimethyl hydroxy ethyl, ammonium hydroxide, sodium hydroxide, potassium hydroxide, tetramethyl ammonium and hydraxide solution is desirably used.

Next, a reverse mask layer 64 for phase shifting made of, for example, metal titanium is deposited using an electron beam deposition method. Conditions thereof are such that an arrival vacuum degree is $2.0 \times 10^{-6}$ Torr, a substrate temperature is equal to a room temperature, an acceleration voltage is 10 kV and an emission current is 95 mA. Under these conditions, a deposition rate is 2 Å/sec. Here, the film thickness of the metal titanium 64 is properly set to 100 Å–200 Å (see FIG. 6C). The thickness of the photoresist pattern 63 should be larger than two times that of the metal titanium 64.

Next, a photoresist layer 65 (trade name RD-2000N: produced by Hitachi Kasei Inc.), for example, is coated over all of the semiconductor substrate 61 to form a phase region (reference pitch region) and a phase shift region (reverse pitch region). This is then dried at a temperature of 80° C. for twenty (20) minutes (see FIG. 6D). The thickness of the photoresist layer 65 is properly set to 1.5 μm–2.0 μm.

Figure 6E:
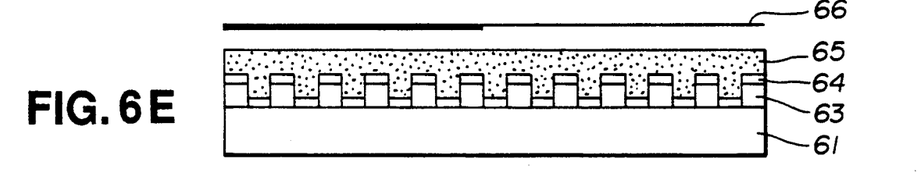
Figure 6F:
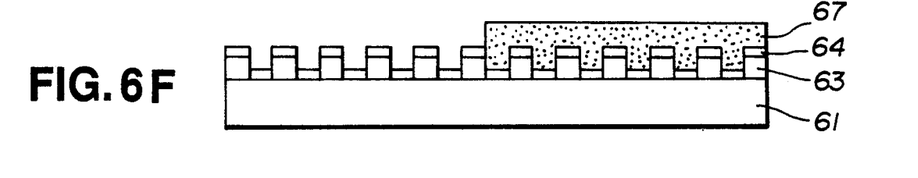

A mask exposure is conducted by a photomask 66 using an ordinary photolithographic technique (see FIG. 6E). Then, development and cleaning are successively performed using a specific developer for the photoresist layer 65 (trade name RD-developer: produced by Hitachi Kasei Inc.) and a specific cleaning liquid (trade name RD-postrinse). A striped pattern 67 is formed on the semiconductor substrate 61 (see FIG. 6F). The striped pattern 67 functions as both of an etching protection layer for the phase shift region at the time of etching the phase region and a lift-off layer for forming a protection layer of the phase region.

Figure 6G:
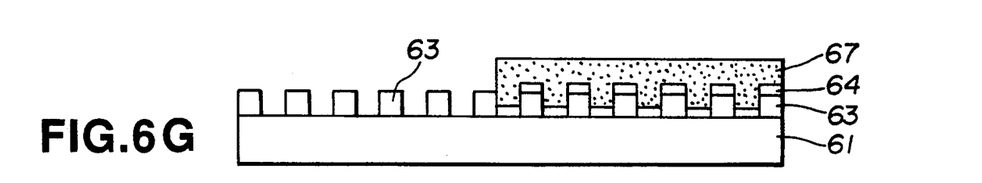

Unnecessary metal titanium is then etched using, for example, a buffered hydrofluoric acid for the purpose of performing the etching of the semiconductor substrate 61 in the phase region (see FIG. 6G). Only the diffraction grating pattern 63 of photoresist remains in the phase region.

Figure 6H:
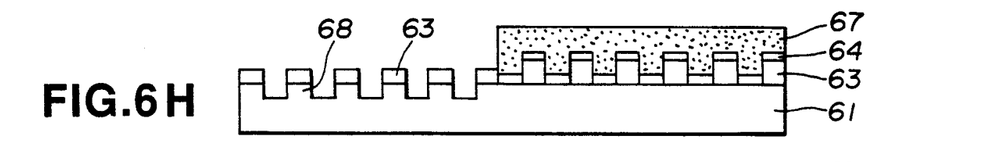

The semiconductor substrate 61 is then etched using, for example, the reactive ion beam etching (RIBE) of chrolide series with the diffraction grating pattern 63 of photoresist on the phase region used as an etching mask (FIG. 6H). At this time, the phase shift region is covered by the etching protection layer of the striped pattern 67.

Figure 6I:
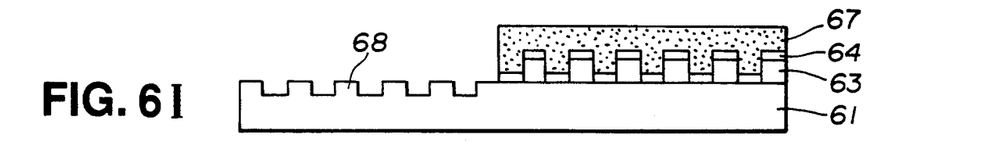

A semiconductor diffraction grating 68 is obtained on the phase region of the semiconductor substrate 61 by removing the above-discussed etching mask in a dry or wet manner (see FIG. 6I).

Figure 6J:
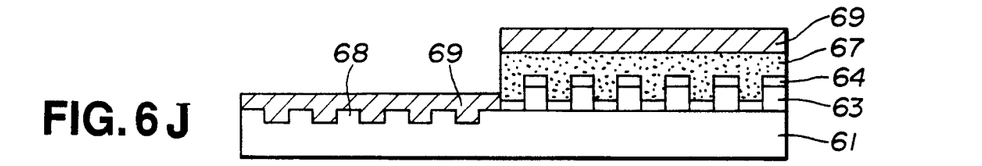
Figure 6K:
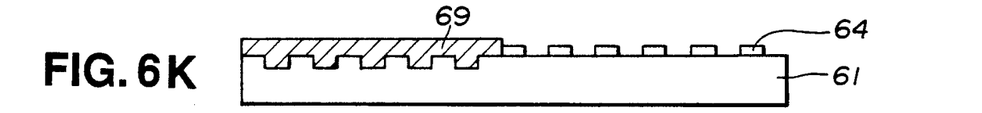
Figure 6L:
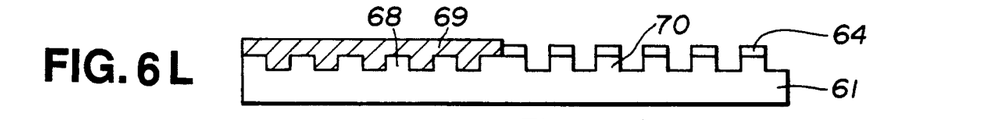
Figure 6M:
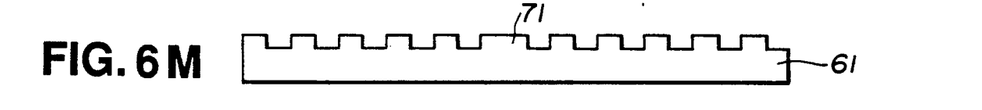

Metal titanium, for example, is then deposited over all of the substrate 61 to form an etching mask layer 69 for the semiconductor diffraction grating 68, using the electron beam deposition method. Conditions thereof are such that an arrival vacuum degree is less than $2.0 \times 10^{-6}$ Torr, a substrate temperature is a room temperature, an acceleration voltage is 10 kV and an emission current is 95 mA. Under these conditions, a deposition rate is 2 Å/sec. Here, the film thickness of the metal titanium 69 is properly set to 2000 Å–3000 Å (see FIG.

6J). A self-alignment using the striped pattern 67 without a mask alignment is conducted to form the phase region and the phase shift region.

The reverse mask layer 64 of metal titanium is then formed by a lift-off method in order to form a diffraction grating in the phase shift region. At this time, the photoresist of the striped pattern 67 which becomes unnecessary together with the diffraction grating pattern 63 of photoresist and the metal titanium 69 for the lift-off which is deposited in the previous step are simultaneously lifted off. Conditions at this time are such that a remover liquid (trade name Microposit Remover 140: produce by Shipley Inc.) is heated to 80°-90° C. by a hot plate and the lift-off is then conducted by means of ultrasonic cleaning. Thus, the semiconductor diffraction grating 68 on the phase region is protected by the metal titanium 69, and the reverse mask layer 64 of metal titanium is formed on the phase shift region (see FIG. 6K).

The semiconductor substrate 61 is then etched using, for example, the reactive ion beam etching (RIBE) of chrolide series with the reverse mask layer 64 on the phase shift region used as an etching mask. Thus, a diffraction grating 70 whose pitch is reverse to that on the phase region is obtained. At this time, the semiconductor diffraction grating 68 on the phase region is protected by the etching mask layer 69 of metal titanium (see FIG. 6L).

Unnecessary metal titanium of the reverse mask layer 64 and the etching mask layer 69 are then removed using, for example, buffered hydrofluoric acid. As a result, a phase-shifted type diffraction grating 71 is obtained on the semiconductor substrate 61 (see FIG. 6M).

In the above-discussed embodiment, various modifications are possible in respective portions or means. For example, the wavelength and kind of the ultraviolet laser for interference exposure may be determined depending on specifications (pitch, depth and so forth) of the phase-shifted diffraction grating. Further, while the semiconductor substrate is used in the above embodiment, glass, optical glass or the like may be utilized. Furthermore, while the photoresist is used as the film material 62, an oxide film such as $SiO_2$ film, a nitride film such as $Si_3N_4$ film or other metal layers, for example, may be used as long as the diffraction grating pattern having the reference period or pitch can be formed.

While the negative type photoresist RD-2000N is used as the photoresist layer 65 that is utilized as the lift-off layer, the kind and type (positive or negative) of the photoresist may be determined according to the specifications of the phase-shifted diffraction grating. Further, the metal titanium is used as the reverse mask layer 64 and the etching mask layer 69, but an oxide layer such as $SiO_2$ film, a nitride film such as $Si_3N_4$ film or other metal layers, for example, may be used. This material may be determined depending on a ratio of layers, a selective ratio or difference in the etching rates between etched materials at the time of etching and the specifications of the phase-shifted diffraction grating.

Further, while the electron beam deposition method is used as a method for forming the metal titanium of the reverse mask layer 64 and the etching mask layer 69, a sputtering deposition method or a resistance heating deposition method may be used depending on the specifications and the materials. Furthermore, the chrolide gas RIBE of a dry method is used for performing the etching of the semiconductor substrate 61, kinds of the etching and the gas are not limited. They may be determined depending on the specifications, materials, selective ratio and the like.

According to the present invention, the following advantages can be obtained, compared with the prior art methods of fabricating the phase-shifted type diffraction grating:

The phase-shifted diffraction grating can be readily fabricated, a diffraction grating having a deep groove can be produced since the etching mask layer can be thickened, the pattern accuracy and the shape stability can be improved, and the transient area can be shortened.

While the present invention has been described with respect to what is presently considered to be the preferred embodiment, it is understood that the invention is not limited to the disclosed embodiment. The present invention is intended to cover various modifications and equivalent arrangements included within the spirit and scope of the appended claims.

What is claimed is:

1. A method for producing a phase-shifted diffraction grating comprising the steps of:
    forming a first diffraction grating pattern of a first material having a reference pitch on a substrate;
    coating a second material different from said first material on both of said first material and an exposed portion of said substrate in a region where a second diffraction grating pattern having a pitch reverse to the reference pitch of said first diffraction grating pattern of said first material is to be formed;
    removing said first material by a lift-off method to obtain said second diffraction grating pattern of said second material having the reverse pitch in said region on said substrate;
    etching said substrate with said first diffraction grating pattern of said first material having the reference pitch used as an etching mask to form a first diffraction grating; and
    etching said substrate with said second diffraction grating pattern of said second material having the reverse pitch used as an etching mask to obtain a second diffraction grating continuous with said first diffraction grating.

2. A method for producing a phase-shifted diffraction grating according to claim 1, further comprising a step of forming a first etching protection layer on said region where said second diffraction grating is to be formed.

3. A method for producing a phase-shifted diffraction grating according to claim 1, further comprising a step of forming a second etching protection layer on a region where said first diffraction grating is formed.

4. A method for producing a phase-shifted diffraction grating according to claim 3, wherein said removing step and said second etching protection layer forming step are simultaneously performed while forming a boundary between said first and second diffraction gratings.

5. A method for producing a phase-shifted diffraction grating according to claim 1, wherein a boundary between said first and second diffraction gratings is formed in a self-alignment manner.

6. A method for producing a phase-shifted diffraction grating according to claim 1, wherein said first diffraction grating pattern has a rectangular shape.

7. A method for producing a phase-shifted diffraction grating according to claim 1, wherein said first diffraction grating pattern forming step comprises: coating a photoresist on said substrate, performing a two-beam interference exposure using a laser for interference exposure and developing said photoresist with an alkaline solution.

8. A method for producing a phase-shifted diffraction grating according to claim 7, wherein said photoresist comprises a base resin of polyvinylphenol or its copolymer with different monomer and a photosensitive agent of quinonediazide group.

9. A method for producing a phase-shifted diffraction grating according to claim 7, wherein the thickness of said photoresist is less than 3000 Å.

10. A method for producing a phase-shifted diffraction grating according to claim 1, wherein said substrate comprises a semiconductor.

11. A method for producing a phase-shifted diffraction grating according to claim 1, wherein said substrate comprises a glass.

12. A method for producing a phase-shifted diffraction grating according to claim 1, wherein said substrate comprises an optical glass.

13. A method for producing a phase-shifted diffraction grating according to claim 1, wherein said second material comprises titanium.

14. A method for producing a phase-shifted diffraction grating according to claim 1, wherein the thickness of said second material is less than one half the thickness of said first material.

15. A method for producing a phase-shifted diffraction grating according to claim 2, wherein said first etching protection layer comprises a photoresist.

16. A method for producing a phase-shifted diffraction grating according to claim 2, wherein the thickness of said first etching protection layer is in a range between 1.5 μm and 2.0 μm.

17. A method for producing a phase-shifted diffraction grating according to claim 3, wherein said second etching protection layer comprises titanium.

18. A method for producing a phase-shifted diffraction grating according to claim 3, wherein the thickness of said second etching protection layer is in a range between 2000 Å and 3000 Å.

19. A method for producing a phase-shifted diffraction grating, said method comprising the steps of:
forming a first diffraction grating pattern of a first material having a reference pitch on a substrate;
coating a second material different from said first material on both of said first material and an exposed portion of said substrate in a region where a second diffraction grating pattern having a pitch reverse to the reference pitch of said first diffraction grating pattern of said first material is to be formed;
forming a first etching protection layer on the region where said second diffraction grating pattern is to be formed;
etching said substrate with said first diffraction grating pattern of said first material having the reference pitch used as an etching mask to form a first diffraction grating;
forming a second etching protection layer on a region where said first diffraction grating is formed;
removing said first material by a lift-off method to obtain said second diffraction grating pattern of said second material having the reverse pitch; and
etching said substrate with said second diffraction grating pattern of said second material having the reverse pitch used as an etching mask to form a second diffraction grating continuous to said first diffraction grating.

20. A method for producing a phase-shifted diffraction grating according to claim 19, wherein said removing step and said second etching protection layer forming step are simultaneously performed while forming a boundary between said first and second diffraction gratings.

21. A method for producing a phase-shifted diffraction grating according to claim 19, wherein a boundary between said first and second diffraction gratings is formed in a self-alignment manner.

22. A method for producing a phase-shifted diffraction grating according to claim 19, wherein said first diffraction grating pattern has a rectangular shape.

23. A method for producing a phase-shifted diffraction grating according to claim 19, wherein said first diffraction grating pattern forming step comprises: coating a photoresist on said substrate, performing a two-beam interference exposure using a laser for interference exposure and developing said photoresist with an alkaline solution.

24. A method for producing a phase-shifted diffraction grating according to claim 23, wherein said photoresist comprises a base resin of polyvinylphenol or its copolymer with different monomer and a photosensitive agent of quinonediazide group.

* * * * *

UNITED STATES PATENT AND TRADEMARK OFFICE
CERTIFICATE OF CORRECTION

PATENT NO. : 5,225,039
DATED : July 6, 1993
INVENTOR(S) : NORIAKI OHGURI

Page 1 of 2

It is certified that error appears in the above-identified patent and that said Letters Patent is hereby corrected as shown below:

COLUMN 1

Line 22, "lasere" should read --lasers--.

COLUMN 3

Line 3, "have" should read --has--.
Line 4, "process" should read --process,--.
Line 5, "utilised." should read --utilized.--.

COLUMN 5

Line 31, "toquinonediazide-5-sulfonylchrolide" should read --thoquinonediazide-5-sulfonylchloride--.
Line 66, "toquinonediazide-5-sulfonylchrolide," should read --thoquinonediazide-5-sulfonylchloride,--.
Line 67, "toquinonediazide-4-sulfonylchrolide" should read --thoquinonediazide-4-sulfonylchloride--.

COLUMN 6

Line 3, "ethyllactate," should read --ethyl lactate,--.
Line 50, "chrolide" should read --chloride--.

UNITED STATES PATENT AND TRADEMARK OFFICE
CERTIFICATE OF CORRECTION

PATENT NO. : 5,225,039
DATED : July 6, 1993
INVENTOR(S) : NORIAKI OHGURI

It is certified that error appears in the above-identified patent and that said Letters Patent is hereby corrected as shown below:

COLUMN 7

Line 13, "produce" should read --produced--.
Line 22, "chrolide" should read --chloride--.
Line 65, "chrolide" should read --chloride--.

Signed and Sealed this

Twenty-fourth Day of May, 1994

Attest:

BRUCE LEHMAN

Attesting Officer

Commissioner of Patents and Trademarks